Dec. 1, 1970  V. J. FOWLER  3,544,202

BEAM-DEFLECTION APPARATUS

Filed Jan. 3, 1966

INVENTOR.
VERNON J. FOWLER

BY R. J. Frank
ATTORNEY.

United States Patent Office 3,544,202
Patented Dec. 1, 1970

3,544,202
BEAM-DEFLECTION APPARATUS
Vernon J. Fowler, East Meadow, N.Y., assignor to General Telephone and Electronics Laboratories, Inc., a corporation of Delaware
Filed Jan. 3, 1966, Ser. No. 518,324
Int. Cl. G02f 1/34
U.S. Cl. 350—285    8 Claims

ABSTRACT OF THE DISCLOSURE

An apparatus for deflecting a beam of electro-magnetic energy. A plurality of piezoelectric blocks, each of which has a reflective surface, are mounted on opposing sides of a support member. The beam is successively incident upon and reflected by the reflective surface of each block. Each block is mounted by affixing to the support member a surface of the block that is adjacent to its reflective surface. An electric field applied to each block induces a shear strain in the block and causes a rotation of its reflective surface. The deflection contributions of the individual blocks are made cumulative by reversing the rotational directions of the reflective surfaces of successive blocks.

---

This invention relates to apparatus for deflecting a beam of electromagnetic energy and more particularly to a device for electrically controlling the direction of propagation of a light beam. The invention described herein was made in the performance of work under a NASA contract and is subject to the provisions of the National Aeronautics and Space Act of 1958, Public Law 85–568 (72 Stat. 426; 42 U.S.C. 2451), as amended.

Various methods have been used in the past to change the direction of propagation of a light beam. In one method, variable reflectors in the form of rotating mirrors driven by electric motors provide the desired deflection. Alternatively, variable refraction systems have employed different types of electro-optic and magneto-optic crystals in which the index of refraction has been made to vary in a particular manner. In another method, deflection is accomplished by passing the light beam through a transparent material, such as a glass or quartz bar, in which intense sound waves have been set up. The sound waves cause the material to act as a diffraction grating, the deflection of the beam being controlled by the frequency of the waves.

The present invention is directed to a variable reflection system wherein the variable reflectors are driven by piezoelectric driving circuits.

Accordingly, an object of this invention is to provide improved apparatus for deflecting a light beam.

Another object is to provide a variable reflection beam deflector having an improved speed of response.

Still another object is to provide an electrically controlled variable reflection beam deflector wherein the driving power requirements are substantially reduced.

In accordance with the present invention, a beam deflector is provided which employed a plurality of piezo-electrically-driven reflecting means. The deflector is constructed in a manner that enables the individual deflections of the plurality of reflecting means to be cumulative.

Each of the reflecting means comprises a block of piezoelectric material having a reflecting surface affixed to a first surface thereof. In addition, each piezoelectric block is provided with a pair of electrodes mounted on opposing surfaces of the block. When a voltage is applied between the electrodes, an electric field is established within the block.

Piezoelectric material exhibits the property that the application of an electric field causes the material to expand or contract in certain directions. The direction in which an applied field develops a strain parallel to the field is termed the poled direction or the direction of poling. A field applied normal to this direction induces a shear strain in the block. This shear strain is, in effect, a couple which induces shear about a rotation axis orthogonal to the direction of the field and to the poled direction. By locating the electrodes on each block such that the resultant field is normal to the poled direction, a shear strain is induced which results in a tilting of the corresponding reflecting surface through an angle determined by the magnitude of the applied field.

The piezoelectric blocks are mounted on a supporting base by affixing a second surface thereof to the base. The second surface, which is adjacent to the first surface, contains a rotation axis normal to the poled direction.

The structure is disposed in the path of the beam of electromagnetic energy to be deflected. The individual blocks are positioned so that the beam is successively incident upon and reflected by the reflector surface of the individual blocks. The path traveled by the beam within the deflector is a zig-zag pattern, the exact shape of which is determined by the orientation of the blocks. In the absence of an applied voltage, this path remains constant with the emerging beam having a particular undeflected direction of propagation.

This direction can be varied by applying a field to one or more of the piezoelectric blocks. The field induces shear strain and the block is rotated about its rotation axis thereby tilting its reflecting surface. The change in position of the reflecting surface varies the angles of incidence and refection of the beam. As a result, the angles of reflection at all successive reflecting surfaces are changed by a corresponding amount and the emerging beam is deflected.

The location of the rotation axis with respect to the reflecting surface of each piezoelectric block is determined by which side or surface of the block is affixed to the supporting base. The rotation axis, as mentioned previously, is orthogonal to the direction of the applied field and the poled direction of the block with the direction of rotation being determined by the polarity of the applied voltage. The direction of the tilt or rotation of the reflecting surface on a particular block is determined by the polarity of the applied field and the poling direction. Reversing either the polarity of the field or the poling direction changes the direction of rotation.

By constructing the deflector such that alternate reflecting surfaces encountered by the beam are tilted or rotated in opposite directions, the angles of incidence and reflection of successive reflecting surfaces encountered by the beam as it travels through the deflector are cumulatively changed, i.e. increased or decreased, with each additional reflection. Stated in another way, if the first, third and other odd-numbered reflecting surfaces rotate clockwise in response to a given magnitude input signal, the deflector is constructed so that the second, fourth, and other even-numbered reflecting surfaces rotate counterclockwise. As a result, the beam which emerges from the deflector is found to be deflected through an angle which is a function of the number of reflections experienced by the beam and the induced angle of tilt of the reflecting surfaces.

Figures 2, 2A:
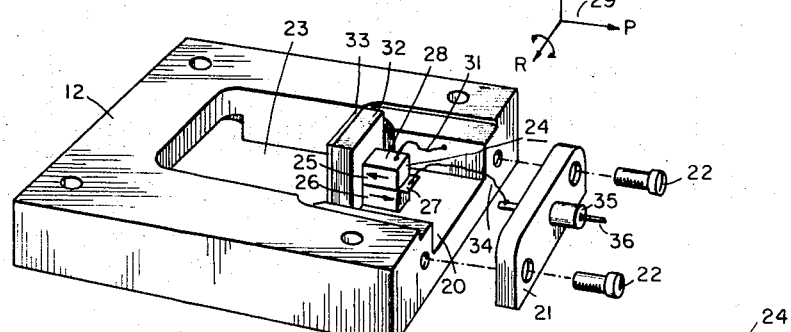
FIG. 2 is a perspective view of an individual piezoelectric reflector employed in the embodiment of FIG. 1

Further features and advantages of the invention will become more readily apparent from the following detailed description of a specific embodiment taken in conjunction with the accompanying drawings in which:

FIG. 2a is a separate view of the piezoelectric block therein; and

Figure 1:
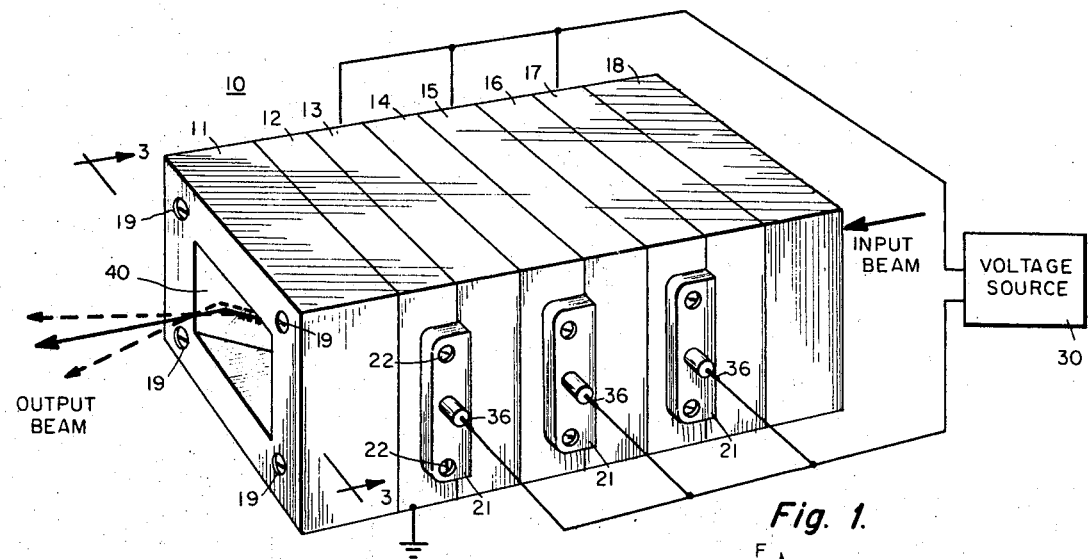
FIG. 1 is a perspective view of one embodiment of the invention.
Figure 3:
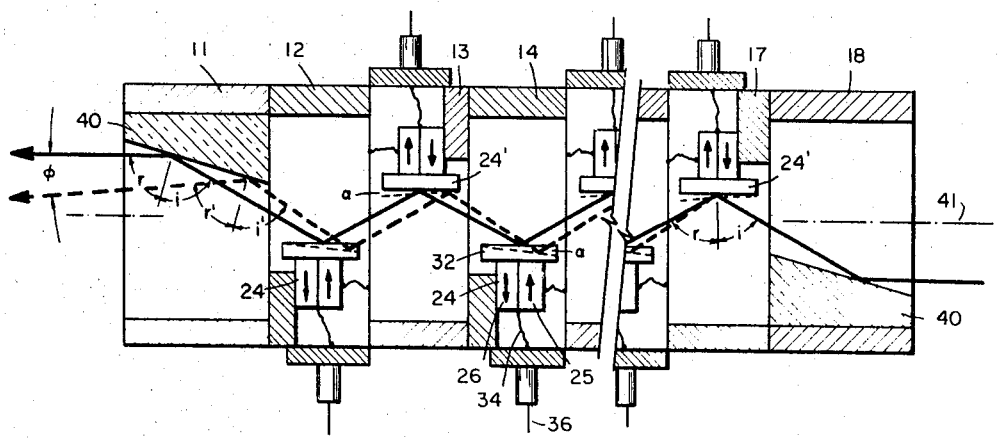

FIG. 3 is a partial top view taken along line 3—3 of FIG. 1.

Referring now to FIG. 1, beam deflector 10 is shown comprising a plurality of rectangular frames 11 through 18, each of which has a central opening therein. The frames form an integral structure and are maintained in alignment by bolts 19. A beam of light entering one end of the deflector passes through the central opening and emerges in the direction shown by the solid line of FIG. 1. When the magnitude of the output of voltage source 30 is other than zero, the beam emerging from the deflector is deflected in a direction determined by the polarity of the output of source 30.

A piezoelectrically-driven reflector is mounted within each of rectangular frames 12 through 17 and is coupled through an insulating plate 21 to source 30. The construction of an individual reflector is shown in FIG. 2 wherein rectangular frame 12 having a central opening 23 is formed with one side having a cut-out portion 20.

Affixed to the cut-out 20 is a piezoelectric block 24 comprised of first and second piezoelectric layers 25 and 26 having an electrode 27 therebetween. Electrode 27 is coupled by lead 34 through insulating plate 21 and bushing 35 to form external connection 36. The top surface of block 24 is provided with a large area conductor 28 which, in turn, is connected to frame 12 by lead 31. The frames are preferably formed of conducting material so that piezoelectric layers 25 and 26 are electrically in parallel. However, if nonconducting frames are employed, a large area conductor is provided on the contacting surface of block 24.

Piezoelectric material exhibits the property that the application of an electric field results in the tension or compression of the material and a corresponding change in dimension. The direction of the applied field which produces a strain parallel to the applied field is referred to as the poled direction and is shown by the arrows of FIG. 2. This direction is related to the direction of the applied electric field during the heat treatment of a piezoelectric ceramic such as lead zirconate-titanate or to the crystallographic directions in a piezoelectric crystal, such as ammonium dihydrogen phosphate.

The application of a field normal to the poled direction of piezoelectric block 24 results in a shear strain in the piezoelectric material. The strain provides a rotation of the block about an axis orthogonal to the direction of the field and to the poled direction. The corresponding directions for block 24 are shown by coordinate axes 29 wherein the P axis is the poled direction, the F axis is the direction of the applied field and the R axis corresponds to the rotation axis. The rotation axis is contained in the surface of block 24 which is affixed to frame 12. In FIG. 2, the bottom surface of block 24 is affixed to the cut-out portion 20 of frame 12 by epoxy or the like.

Piezoelectric block 24 is shown comprising layers 25 and 26 which are poled in opposite directions and are connected electrically in parallel. As a result, the rotational effects of each layer are additive since the direction of rotation may be reversed by reversing either the poled direction or the polarity of the field. The rotation of block 24 is shown more clearly in the separate view of FIG. 2a wherein the dotted outline indicates the dimensional change produced by the rotation of the block about its rotation axis. It will be noted that only the surface area of the block shown containing arrows and its opposing surface are substantially distorted. The remaining surface areas, including the inward-facing surface, are maintained essentially undistorted.

A dielectric faceplate 32 is affixed to the inward-facing surface of block 24 and is tilted about the rotation axis in accordance with the rotation of the piezoelectric block. A reflecting coating is provided on the exposed surface of faceplate 32. The assembly is completed by securing insulating plate 21 to the frame by bolts 22.

As shown in FIG. 1, the rectangular frames are coupled to a reference potential, i.e., ground, and external connections 36 are coupled to voltage source 30. External connections are shown only for frames 12, 14 and 16, the connections for frames 13, 15, and 17 being located on the opposite side of deflector 10. The construction of frames 13 through 17 is similar to that of frame 12. However, frames 11 and 18 are provided with fixed reflecting wedges 40, formed of glass, quartz and the like, rather than with piezoelectric reflectors. While these frames may be omitted if desired, their inclusion enables the input beam to be predeflected onto the central portion of the reflecting surface within frame 17 and the output beam to be post-deflected so that when the deflector is unenergized, the input and output directions are parallel and substantially collinear.

The operation of the deflector is shown diagrammatically in the partial top view of FIG. 3 with the solid line indicating the path of the input light beam when the deflector is in its unenergized state. The piezoelectric 24 and 24' are positioned on either side of the central axis 41. The initial deflection provided by reflecting wedge 40 results in the input beam striking the central portion of the reflecting surface of piezoelectric block 24' of the adjacent frame 17. The blocks are disposed on either side of central axis 41 and are displaced from each other along this axis. The beam then travels through the deflector in a zig-zag path while being alternately reflected by the piezoelectric reflectors on either side of the central axis.

In the absence of an applied voltage, the input beam is incident upon the central portion of the reflecting surface of each piezoelectric block 24, 24', as shown by the solid line of FIG. 3, and is deflected just prior to emerging by output reflecting wedge 40. However, the application of a voltage to the deflector establishes a field in each piezoelectric block which causes a rotation of the blocks and a tilting of the corresponding reflecting surfaces.

As mentioned previously, the direction of rotation of each block and reflecting surface for a given polarity of applied voltage is determined by the poled direction of the block. It will be noted from FIG. 3, that the poling directions are reversed in alternate blocks. As a result, the applied voltage rotates blocks 24 in a direction opposite to the rotation of blocks 24'.

The dashed line associated with each reflecting surface in FIG. 3 illustrates the rotation of the surfaces for a given applied voltage. The rotation changes the angle of incidence $i$ of the input beam on each surface and the angle of reflection $r$. This effect is cumulative as shown by the dashed path since the angle of reflection from a reflection surface determines in part the angle of incidence on the next succeeding surface. Thus, the angle of reflection from this next succeeding surface is determined by the tilting of the surface and the angle of reflection from the preceding surface. The opposite direction of rotation of alternate blocks provides a cumulative change in the angle of reflection at a given surface since each reflection reverses the sense of rotation (e.g., from clockwise to counter-clockwise). Consequently, the angle of incidence $i'$ on the output reflecting wedge is decreased and the angle of reflection $r'$ therefrom is similarly decreased so that the emerging beam is deflected through an angle $\phi$.

The light beam passed through the deflector is deflected by an angle $\phi$ equal to $2n\alpha$, where $n$ is the number of piezoelectric reflectors and $\alpha$ is the angle of tilt of each reflecting surface. In one embodiment tested and operated with 10 ceramic lead zirconate titanate piezoelectric blocks, the angle of tilt produced with an applied voltage of 900 v. was 0.022 degrees. The range of deflection angles obtained was ±0.44 degrees.

Although each of the piezoelectric blocks 24, 24' were formed of a plurality of oppositely poled layers, single blocks of piezoelectric material may be employed if desired. However, the stacked configuration is found to reduce the voltage required for a given angle of tilt by a factor of $m$, where $m$ is the number of layers per block. Also, locating the rotation axis of alternate blocks on opposite sides of the piezoelectric blocks is found to substantially eliminate the effects of thermal distortion of piezoelectric material since any distortion produced is in the opposite direction for successive blocks and is cancelled.

While the above description has referred to a specific embodiment, it will be recognized that many variations and modifications may be made therein without departing from the spirit and scope of the invention.

I claim:

1. Apparatus for deflecting a beam of electromagnetic energy which comprises:
    (a) support means;
    (b) a plurality of spaced apart piezoelectric blocks successively mounted on opposing sides of said support means, each of said blocks having first, second, third, and fourth surfaces thereon, said first and fourth and said second and third surfaces being opposing surfaces, each of said blocks having a poled direction parallel to said second and third surfaces, said blocks having their second surfaces affixed to said supporting means and their first surfaces positioned essentially parallel to each other in the path of the beam;
    (c) reflecting means formed on the first surface of each of said blocks so that said beam is successively incident upon and reflected by each of said reflecting means, said beam travelling in a zig-zag path;
    (d) a plurality of first and second electrodes, said first and second electrodes being mounted on the second and third surfaces respectively of each of said blocks, the application of a voltage between each of said first and second electrodes inducing a shear strain in each of said blocks and thereby causing a rotation of each of said reflecting means so that the angles of incidence and reflection of the beam at said first surfaces are varied; and
    (e) means for applying a voltage between said first and second electrodes, the variation of said angles being determined by the polarity of the applied voltage and of the poled direction, one of these determinants being varied in successive blocks while keeping the other unchanged whereby the variation in said angle is cumulative as said beam is successively reflected.

2. Apparatus in accordance with claim 1 in which the poled direction of successive blocks is reversed.

3. Apparatus in accordance with claim 2 in which said reflecting means comprises a dielectric layer formed on said first surface and a reflecting layer formed on said dielectric layer.

4. Apparatus in accordance with claim 1 wherein each of said piezoelectric blocks comprises a plurality of piezoelectric wafers having intermediate electrodes formed therebetween.

5. Apparatus in accordance with claim 4 in which the wafers comprising said blocks are connected electrically in parallel.

6. Apparatus for deflecting a beam of electromagnetic energy which comprises:
    (a) support means;
    (b) first and second pluralities of piezoelectric blocks, each of said blocks having first and second adjacent surfaces thereon, each of said blocks having a poled direction, said blocks having their second surfaces affixed to said support means, said first plurality of blocks being mounted in spaced relation on one side of a central axis, said second plurality of blocks being mounted in spaced relation on the opposing side of said central axis and displaced therealong with respect to said first plurality, said first surface of each of said blocks facing said central axis, the poled direction of said first plurality of blocks being opposite to that of said second plurality;
    (c) reflecting means formed on the first surface of each of said blocks, the beam being alternately incident on and reflected by the reflecting means on said first and second plurality of blocks; and
    (d) means for applying an electric field to each of said blocks, said filed being orthogonal to the poled direction of said blocks, the application of said field inducing a shear strain in said blocks whereby the reflecting means on said first plurality of blocks is rotated in the opposite direction with respect to the reflecting means on said second plurality of blocks.

7. An apparatus for deflecting an incident beam of electromagnetic radiation comprising:
    (a) support means;
    (b) a plurality of spaced apart piezoelectric blocks, each of said blocks having first and second adjacent surfaces and a poled direction parallel to said second surface, each of said second surfaces being fixed to said support means;
    (c) reflecting means formed on the first surfaces of each of said blocks, said reflecting means being positioned in the path of said incident beam of electromagnetic radiation so that said beam is successively incident upon and reflected by each of said reflecting means; and
    (d) means for applying an electric field to each of said blocks, said electric field being applied in a direction normal to said poled direction thereby inducing a shear strain in each of said blocks so as to cause rotation of each of said reflecting means about an axis orthogonal to said poled direction and said direction of the applied electric field.

8. An apparatus in accordance with claim 7 in which the direction of rotation of the reflecting means formed on each blocks is opposite to the direction of rotation of the reflecting means formed on each of the immediately preceding and succeeding blocks.

References Cited

UNITED STATES PATENTS

| | | | |
|---|---|---|---|
| 2,920,529 | 1/1960 | Blythe | 350—285 |
| 3,146,367 | 8/1964 | McNaney | 350—269 X |
| 3,349,174 | 10/1967 | Warschauer | 350—285 X |

RONALD L. WIBERT, Primary Examiner

P. K. GODWIN, Assistant Examiner

U.S. Cl. X.R.

178—7.6; 310—8.1, 8.6, 9.1